United States Patent
Herges

(10) Patent No.: US 7,628,459 B2
(45) Date of Patent: Dec. 8, 2009

(54) METHOD FOR AUTOMATICALLY BRAKING A VEHICLE EQUIPPED WITH AN ELECTRONICALLY CONTROLLED BRAKE SYSTEM

(75) Inventor: Michael Herges, Korntal-Muenching (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/943,390

(22) Filed: Nov. 20, 2007

(65) Prior Publication Data

US 2008/0149437 A1 Jun. 26, 2008

Related U.S. Application Data

(63) Continuation of application No. PCT/EP2006/004820, filed on May 22, 2006.

(30) Foreign Application Priority Data

May 23, 2005 (DE) .................. 10 2005 023 665

(51) Int. Cl.
*B60T 13/00* (2006.01)
*B60D 1/28* (2006.01)

(52) U.S. Cl. .................. 303/20; 303/89; 188/138; 188/DIG. 2

(58) Field of Classification Search .......... 303/89, 303/14, 20; 188/138, 156, 265, DIG. 2, 106 F; 180/271; 192/219.1, 219.4
See application file for complete search history.

(56) References Cited

U.S. PATENT DOCUMENTS

| | | | | |
|---|---|---|---|---|
| 2,914,358 A | * | 11/1959 | Schjolin | 303/6.1 |
| 4,018,485 A | * | 4/1977 | Fannin | 303/13 |
| 4,265,492 A | * | 5/1981 | Pollinger | 303/14 |
| 4,281,736 A | * | 8/1981 | Lizzio | 180/271 |
| 4,871,215 A | * | 10/1989 | Takayama | 303/191 |
| 6,246,313 B1 | * | 6/2001 | Baker et al. | 340/425.5 |
| 6,256,568 B1 | * | 7/2001 | Siepker et al. | 701/62 |
| 6,631,796 B2 | * | 10/2003 | Yanaka et al. | 192/219.4 |
| 6,702,400 B1 | * | 3/2004 | Eberling | 303/6.1 |
| 7,204,563 B2 | * | 4/2007 | Soupal | 303/7 |

(Continued)

FOREIGN PATENT DOCUMENTS

DE 3341975 A1 * 6/1985

(Continued)

OTHER PUBLICATIONS

International Search Report dated Aug. 28, 2006 w/English translation (six (6) pages).

(Continued)

*Primary Examiner*—Melody M Burch
(74) *Attorney, Agent, or Firm*—Crowell & Moring LLP

(57) ABSTRACT

A method and system for automatic braking is described. A service brake which can be operated electrically with a compressed air pressure and a parking brake which can be operated electrically are provided. When the vehicle stops due to the service brake being applied, the service brake is released and the parking brake is applied as a function of a release criterion. The release criterion includes the parking brake not being applicable manually because of a defect, and the operation of a control element for application of the parking brake.

8 Claims, 2 Drawing Sheets

U.S. PATENT DOCUMENTS

2005/0029859 A1    2/2005    Bensch et al.

FOREIGN PATENT DOCUMENTS

| DE | 198 31 541 | A1 | 3/2000 |
| DE | 198 49 799 | A1 | 6/2000 |
| DE | 101 04 498 | A1 | 8/2002 |
| DE | 102 13 346 | A1 | 9/2003 |
| DE | 103 36 611 | A1 | 3/2005 |

OTHER PUBLICATIONS

Form PCT/IB/338 and Form PCT/IPEA/409 (Nine (9) pages).

* cited by examiner

METHOD FOR AUTOMATICALLY BRAKING A VEHICLE EQUIPPED WITH AN ELECTRONICALLY CONTROLLED BRAKE SYSTEM

CROSS REFERENCE TO RELATED APPLICATIONS

This application is a continuation of International Patent Application no. PCT/EP2006/004820, filed May 22, 2006, which claims priority to German Patent Application no. 10 2005 023 665.0, filed May 23, 2005, the contents of each of which are expressly incorporated by reference herein.

BACKGROUND AND SUMMARY OF THE INVENTION

The invention is a method for automatic braking, without any active braking operation by the driver, of a vehicle equipped with an electronically controlled braking device which has a service brake, which can be operated electrically and to which a service braking pressure can be applied, and a parking brake, which can be operated electrically and to which a parking braking pressure can be applied. Starting from a state in which the vehicle is stationary as a result of the service brake being applied, the service brake is released and the parking brake is applied as a function of a release criterion.

In conjunction with electronic braking systems (EBS), there are automatic braking methods, such as hillholding, brake-hold and release aid, automatic starting aids or rolling inhibitors, which keep a vehicle stationary after stopping, automatically using the service brake, without the driver having to operate the brake pedal. The service brake is then released automatically again only when the driver starts to drive again by operating a control device such as the gas pedal or clutch pedal, for example, or by selection of a gear. In this case, the vehicle is generally held stationary by the electrically operated, pneumatic service brake. However, this requires energy all the time in the form of compressed air and electrical power. When operating continuously without the engine operating, there is a tendency for the brake to be released, or at least for the braking force to decrease, after a certain amount of time. Alternatively, the parking brake can be operated in order to keep the vehicle in the braked state, as is proposed by way of example in German Patent Document DE 3 521 486 where it is electrically operated. In the case of commercial vehicles, the parking brake is formed by a spring energy storage brake with an energy storage spring which acts against a piston to which compressed air can be applied, with the spring energy storage brake being released by application of air, or being applied by evacuation.

However, this has the disadvantage that the parking brake has a poor dynamic response and requires a relatively large amount of air.

Another conventional method is known from German Patent Document DE 102 38 870 A1. In this case, the service brake is used to produce a braking torque which keeps the vehicle stationary, with the parking brake being operated automatically, and the service brake released, once a holding time interval has passed. This means that the parking brake is applied whenever the stationary period is longer than the predetermined holding time. By way of example, this is disadvantageous when the holding time is shorter than the time during which the vehicle is stationary, for example when stopped at traffic lights, at level crossings when the barriers go down, or on driving onto a road with priority, with a large amount of traffic on it. This is because the parking brake, which has a relatively poor dynamic response, is then applied and must be released again in order to drive away, which takes a certain amount of time and consumes a large amount of compressed air. In order to keep the reaction time as short as possible, relatively large application of air cross sections and a very powerful compressed-air supply must therefore be provided.

German Patent Document DE 103 36 611 A1 discloses a method in which, after previous manual activation of a rolling braking function, on identification that the vehicle is stationary, the braking pressure of the service brake is first of all maintained at the current level. When the driver switches off the voltage supply by means of the ignition switch, or in the event of a defect in the service brake, the parking brake is activated automatically.

In the case of a method according to German Patent Document DE 101 04 498 A1, an automatic changeover takes place from the service brake to the parking brake after activation of a hill-holder function by increasing the braking pedal force by the driver, and after the ignition has been switched off.

However, the cited methods require the driver to carry out active actions (activation of the rolling braking function and/or increasing the pedal force), which, however, the driver may neglect or fail to do, in consequence not resulting in the desired automatic changeover from the service brake to the parking brake.

German Patent Document DE 198 49 799 A1, which forms the prior art in this context, discloses a method in which the parking brake is automatically applied and the service brake is released after a long-term parking condition is satisfied, which is regarded as having been satisfied by the ignition being interrupted.

In contrast, embodiments of the present invention develop a method of the type mentioned above such that the automatic changeover from the service brake to the parking brake can be used for further functionalities.

The exemplary embodiments of the invention provides systems and methods by which when a vehicle is being kept stationary by the service brake, the switching off of the vehicle drive or vehicle engine represents the primary release criterion that is used as the basis for automatic release of the service brake and application of the parking brake. This is because during normal operation, the engine produces not only sufficient compressed air but also sufficient electrical power in order to allow the service brake to be operated safely. In this case, the application of the parking brake in response to the release criterion is initiated without any delay, that is to say without the holding time described in German Patent Document DE 102 38 870 A1. This has the advantage that, during operation of the vehicle, that is to say when the engine is running, the time required to release the brake is relatively short, since the service brake has a comparatively good dynamic response. In consequence, the parking brake is engaged only when it is expected that the vehicle will be stationary for a relatively long time, that is to say after the vehicle drive or engine has been switched off.

According to a further exemplary aspect of the invention, the initiation criterion for the automatic release of the service brake, which then follows this, and application of the parking brake occurs when the service braking pressure falls to a critical braking pressure limit value. Furthermore, as an initiation criterion for the automatic release of the service brake and application of the parking brake, the invention is also used in the situation in which the service brake is not operable, for example because of a defect. In neither exemplary case would the service brake be able to prevent the vehicle from rolling. A person skilled in the art will understand that the magnitude of this critical braking pressure limit value is different depending on the surrounding circumstances, for example to the nominal supply pressure, on the braking cylinder volumes, etc.

In addition, the situation in which the vehicle power supply system voltage has fallen to a critical voltage limit value is also intended to be used, according to a further exemplary aspect of the invention, as an initiation criterion for automatic release of the service brake and application of the parking brake. This is because, when the vehicle power supply system voltage is too low, it is no longer possible to release or apply the electrically controlled service brake, as a result of which total failure of the vehicle brake is prevented by producing appropriate control commands in the controller, by making use of the residual voltage that is still adequate, in order to initiate the automatic release of the service brake and the application of the parking brake, thus preventing inadvertent rolling of the vehicle.

Furthermore, the exemplary situation in which the parking brake can no longer be applied manually because of a defect can be used as an initiation criterion for the automatic release of the service brake and application of the parking brake. A defect in the control device for the parking brake and/or in the way in which its signals are passed on can be detected by suitable sensors.

Operation of a control element for activation of the parking brake may represent an initiation criterion for the automatic release of the service brake and application of the parking brake, in which case, in contrast to the teaching of German Patent Document DE 102 38 870 A1, there is no need to wait for a holding time to pass before the application of the parking brake is initiated. This is advantageous in particular in situations in which the vehicle starts to roll despite the service brake being applied, in some circumstances due to being defective, as a consequence of which the parking brakes must respond very quickly.

The exemplary method steps according to the invention are preferably initiated and controlled by a common electronic controller for the service and parking braking system, or by using the parking braking system being controlled electronically, separately from the service braking system, in communication with the electronic control for the EBS braking system.

According to an exemplary embodiment, starting from the state in which the parking brake is applied and the service brake is released with the vehicle drive switched off, the service brake is automatically applied when the vehicle drive is restarted, and the parking brake is automatically released. In consequence, those method steps which have led to automatic braking and stopping of the vehicle are passed through in the opposite sequence on restarting, with the applied service brake preventing the vehicle from rolling. In this case, the process of releasing the parking brake is preferably initiated only when the service brake is applying a certain minimum braking effect. In contrast, this improves safety since the vehicle will not roll during the changeover from the parking brake to the service brake. When starting off, that is to say when sufficiently high drive torque is present in the drive train, the service brake is then finally automatically released.

In an analogous manner, during the changeover from the service brake to the parking brake after the vehicle drive has been switched off, the time at which the braking effect of the parking brake has reached a specific minimum value with sufficiently high confidence level is preferably in fact used to reduce the braking effect of the service brake to match the increase in the braking effect of the parking brake. Once the parking brake has reached its maximum braking effect or braking force, the service brake is switched off. Finally, once the parking brake has been applied, the service braking control and the parking braking control are switched off.

The release and application of the service brake and of the parking brake in opposite senses when the vehicle drive is switched off and started again are preferably controlled by a characteristic. In this case, by way of example, the braking effect which is produced by the energy storage spring of the parking brake is determined on the basis of the instantaneous pressure, the time which has passed or other measured variables, by using an estimation algorithm. This estimation algorithm may include a delay element since there is generally a certain delay between the signal for the controller and the reaction in the braking cylinder. In consequence, there is no need for any stepped open-loop or closed-loop control of the pressure for the parking braking pressure.

In the situation when the braking effect of the parking brake is not sufficient to prevent the vehicle from rolling freely, the service brake is, for example, once again applied, and an audible and/or visual warning signal is produced. According to another exemplary embodiment of the invention, when the service brake is used for braking before the vehicle is stationary, a service braking force which is required to stop the vehicle by braking is calculated and is compared with the maximum parking braking force which can be produced by the parking brake, with an audible and/or visual warning signal being produced if the service braking force is greater than the parking braking force. This is because, in this case, the maximum parking braking force which can be produced by the parking brake is not sufficient to keep the vehicle stationary. Alternatively, the braking effect which takes place before the vehicle comes to rest can also be produced by the service brake with a service braking force which is at most as great as the maximum parking braking force which can be produced by the parking brake. It is therefore possible for the driver to tell whether the maximum parking braking force which can be produced by the parking brake is sufficient to prevent the vehicle from rolling. In a particular preferable embodiment, once the service brake has been released and the parking brake has been applied when the engine stops and the ignition switch switched off, at least a portion of the braking control of the EBS braking system is switched off. This results in energy-saving advantages, in order to prevent discharging of the vehicle battery.

According to one development, when the control element for the parking brake is operated, the service brake is applied in order to produce the state in which the vehicle is stationary, with the service brake being released and the parking brake being applied once the vehicle drive has been switched off. This has the advantage that the electronic braking system (EBS) can be used in a highly controllable manner for braking while driving, once again controlled by the control element for the parking brake, even though the actuator for operation of the parking brake has only an on-off functionality. If braking using the electronic braking system (EBS) is not possible, the parking brake can be activated immediately.

BRIEF DESCRIPTION OF THE DRAWINGS

One exemplary embodiment of the invention will be explained in more detail in the following description and is illustrated in the drawings, in which.

DETAILED DESCRIPTION OF THE DRAWINGS

The invention relates to a system and method for automatic braking, without any active operation by the driver, of a commercial vehicle equipped with an electronically controlled braking device (EBS). According to one preferred embodiment of the invention, the EBS braking system has a service brake, which can be operated electrically and to which a service braking pressure $p_B$ can be applied, and a parking brake, which can be operated electrically and to which a parking braking pressure can be applied, in the form of a spring energy storage brake with an energy storage spring which acts against a piston to which compressed air can be applied. The energy storage spring is released, for example, by application of air which may be applied by evacuation. The service brake is an active pneumatic brake, that is to say it is applied by application of air to a service braking cylinder, and is released by evacuation. An electronically controlled braking system (EBS) such as this for commercial vehicles may contain an electronic control unit which can be subdivided into a plurality of local control units and, as in the present case by way of example, includes a service braking controller and a parking braking controller, which control the braking processes of the service brake and of the parking brake.

Figure 1:
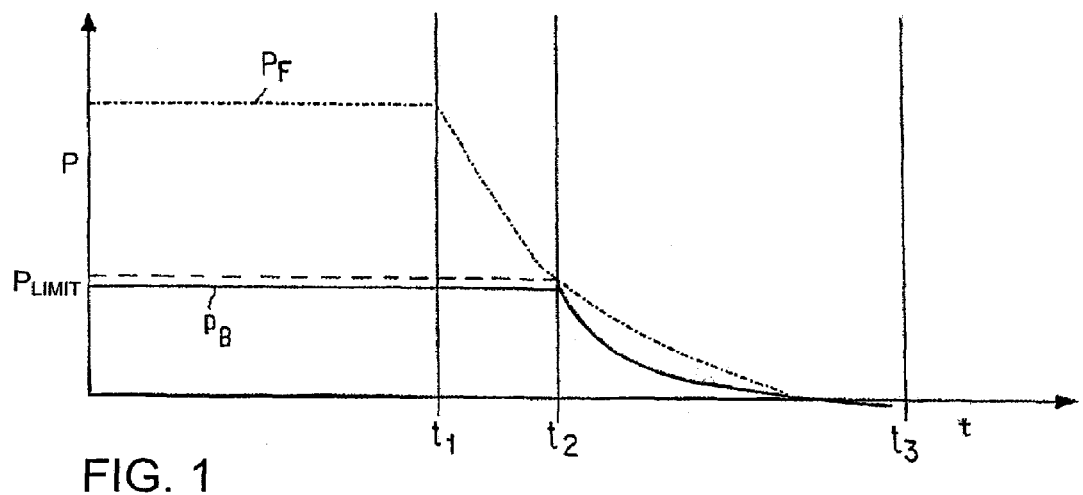
FIG. 1 shows a braking pressure profile, plotted against time, of one preferred embodiment of the braking process according to the invention.
Figure 2:
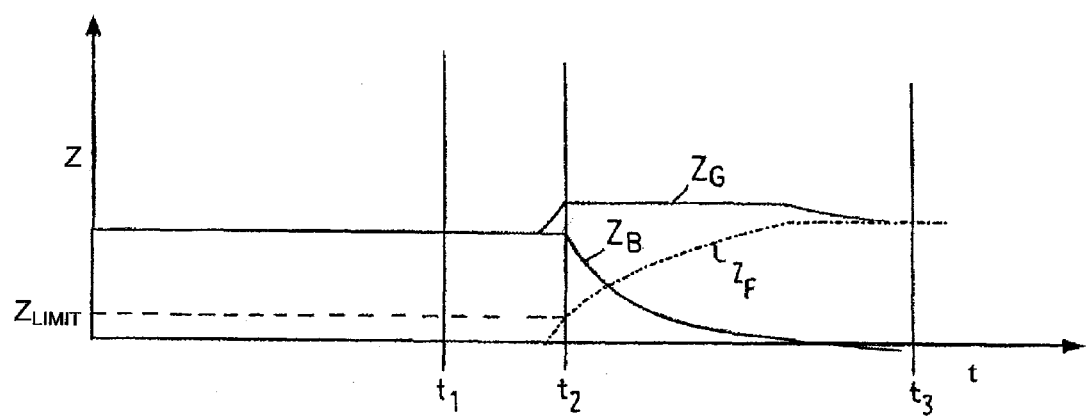
FIG. 2 shows a braking profile, plotted against time, of a braking process according to the invention as shown in FIG. 1.

FIG. 1 shows the exemplary profile of a braking process according to the invention, plotted over time. In this case, the profile of the spring energy storage braking pressure $p_F$ of the parking brake and the service braking pressure $p_B$ of the service brake are plotted over the time t. In contrast, FIG. 2 shows the braking Z plotted over time t, defined as the ratio between the braking force and the normal force. In this case, $Z_B$ denotes the braking effect associated with the service brake, $Z_F$ denotes the braking effect associated with the parking brake, and $Z_G$ denotes the total braking effect of the sum of $Z_B$ and $Z_F$.

The two graphs in FIG. 1 and FIG. 2 start at the time t=0 from a state in which the commercial vehicle has been brought to rest from motion by application of the service brake and, in consequence, there is a pressure $p_B$ in the service braking cylinder. The parking brake, which is in the form of a passive spring energy storage brake, is in contrast released by the spring energy storage pressure $p_F$.

Starting from this state, the aim is to release the service brake and to apply the parking brake as a function of at least one initiation criterion. By way of example, one initiation criterion comprises the vehicle drive being switched off for the commercial vehicle, which is kept at rest by the service brake at a time $t_1$. At this time, the spring energy storage braking cylinder is evacuated without any delay, in response to which the spring energy storage braking pressure $p_F$ falls. However, the drop in the pressure $p_F$ does not immediately result in a parking braking force, since the spring energy storage piston must travel over a certain inactive distance. For this reason, the service brake is still applied, and the service braking pressure $p_B$ remains at its initial level until the spring energy storage braking pressure $p_F$ has fallen to a lower limit $p_{limit}$, which is sufficient to produce a minimum parking braking force. The value of this lower limit pressure $p_{limit}$ can be matched as appropriate to the given circumstances by a person skilled in the art. The process of releasing the service brake by reducing the service braking pressure $p_B$ is initiated only when this lower limit pressure $p_{limit}$ is reached, at a time $t_2$. In consequence, the service braking pressure $p_B$ is not decreased before the spring energy storage braking pressure $p_F$ has reached the lower limit pressure $p_{limit}$. When both the service braking cylinder and the parking braking cylinder are evacuated at the time $t_3$, that is to say when the service brake has been released completely and the spring energy storage brake has been applied completely, the service braking controller and the parking braking controller are switched off.

The release and application of the service brake and of the parking brake in opposite senses are preferably carried out and controlled by a characteristic. In this case, for example, the braking effect which is produced by the energy storage spring for the parking brake is determined on the basis of the instantaneous pressure, the time that has passed and/or some other measured variable, using an estimation algorithm. This estimation algorithm may include a delay element since there is generally a certain delay between the signal for the controller and the reaction in the respective braking cylinder. Only when the braking effect or the braking action Z of the parking brake has reached a specific limit value $Z_{limit}$ with a sufficiently high degree of confidence is the braking effect $Z_B$ of the service brake reduced to the same extent that the braking effect $Z_F$ of the parking brake is increased, specifically from the time $t_2$, as can be seen from FIG. 2, which characterizes the start of the decrease in the service braking pressure $p_B$. In consequence, after the time $t_2$, the total braking effect $Z_G$ becomes greater than previously, thus improving the safety against the commercial vehicle rolling. Once the parking brake has then reached its maximum braking effect or braking action, the service brake is then switched off.

Since the situation in which the vehicle which is being braked with the service brake is normally brought about by operation of the service brake, it is also possible, according to one exemplary embodiment of the invention, for the service brake to be applied, in order to produce this state, by operation of the control element for the parking brake before the time t=0. In this case, the braking device is designed such that the service brake can be activated or applied by the control element for the parking brake. The service brake is then released and the parking brake applied as described above with reference to FIG. 1 and FIG. 2, with the initiation criterion representing the vehicle drive being switched off.

Starting from the state at the time t=0, in which the parking brake is applied and the service brake is released with the vehicle drive switched off and the braking control switched off, the braking control is activated at the same time that the vehicle drive is restarted. This automatically releases the parking brake and applies the service brake. In consequence, the method steps which have led to automatic braking and stopping of the vehicle are carried out in the opposite sequence on restarting, with the applied service brake then preventing the vehicle from rolling. When starting off, that is to say when a drive torque is present in the drive train, the service brake is then released automatically. This situation is illustrated in FIG. 3 and in FIG. 4.

Figure 3:
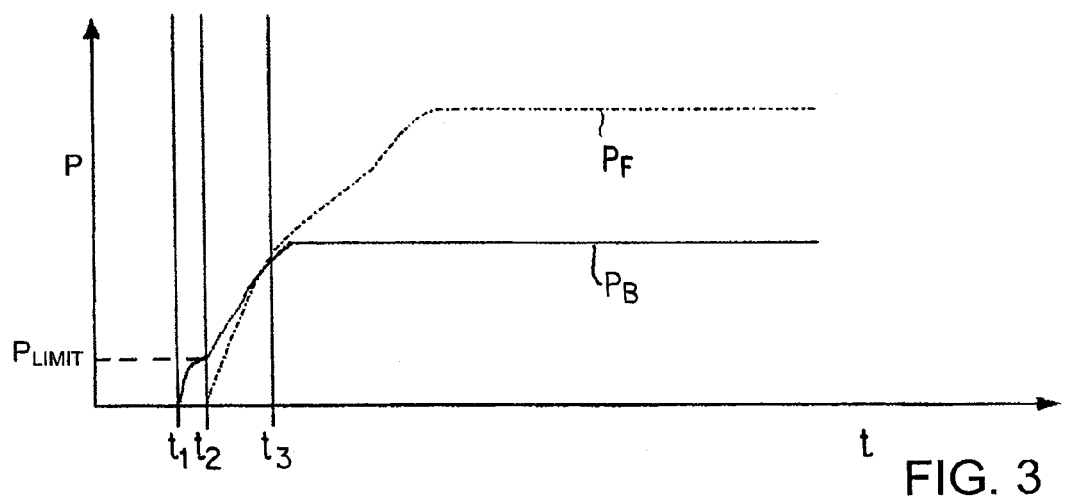
FIG. 3 shows a braking pressure profile, plotted against time, after the vehicle has been started.

FIG. 3 shows the pressure profile, plotted over time, for the spring energy storage braking pressure $p_F$ and the service braking pressure $p_B$ when the vehicle drive is started at the time $t_1$. At this time, the service braking pressure $p_B$ in the service braking cylinder is built up, with the build-up in the spring energy storage braking pressure $p_F$ starting only when the service braking pressure $p_B$ has reached a certain minimum service braking pressure $p_{limit}$ at a time $t_2$ in order to release the parking brake. In consequence, the process of releasing the parking brake is firstly initiated at the time $t_2$ when the service brake is already applying a certain minimum braking effect or minimum braking action $Z_{limit}$ (see FIG. 4). The parking brake is then released at a time $t_3$, even though the spring energy storage braking pressure $p_F$ can be increased further in order to travel over the inactive distance before the spring energy store is loaded completely, as is illustrated in FIG. 3.

Figure 4:
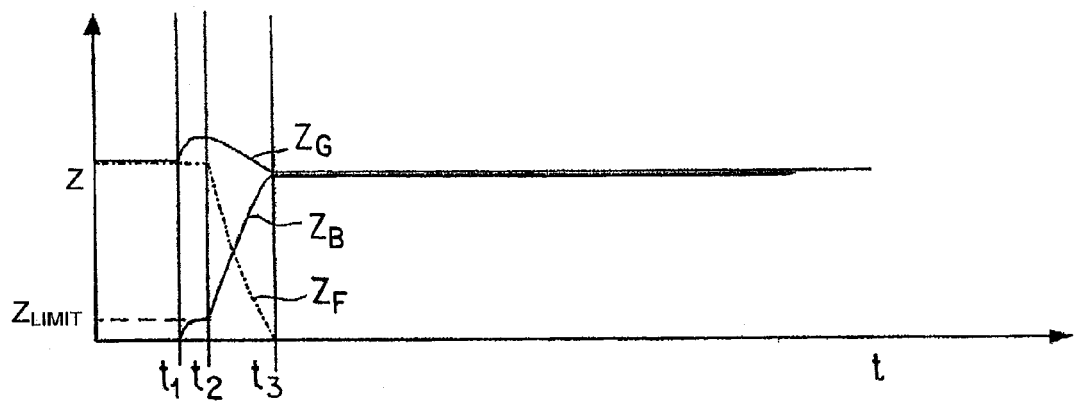
FIG. 4 shows the braking profile, plotted against time, after the vehicle has been started.

With respect to the braking action Z or the braking effect in FIG. 4, this means that, over the course of the time period which extends from the start of the drive at the time $t_1$ to the start of the build-up of the parking braking pressure $p_F$ at the time $t_2$, an overall braking effect $Z_G$ is reached which is greater than the braking effect of $Z_F$ of the parking brake before the drive is restarted. This also applies to the braking process shown in FIG. 2, while the total braking effect $Z_G$ at least in the time interval between $t_2$ and $t_3$ is greater than the braking effect $Z_B$ of the service brake of the time $t_1$, at which the vehicle drive is switched off. This initiation criterion for the changeover from the service brake to the parking brake and vice versa is not restricted to the vehicle drive being switched off or on. In fact, the exemplary initiation criterion may be at least one of the following criteria:

- the service braking pressure falls to a critical braking pressure limit value;
- the service brake is not operable;
- the vehicle power supply system voltage falls to a critical voltage limit value;
- the parking brake cannot be applied manually because of a defect;
- the operation of a control element for application of the parking brake.

The invention claimed is:

1. Method for automatic braking, without active braking operation by a driver, of a vehicle equipped with an electronically controlled braking device, including a service brake operable electrically and to which is applicable a service braking pressure ($p_B$), and a parking brake operable electrically and to which is applicable a parking braking pressure ($p_F$), comprising the acts of:

starting from the vehicle being stationary as a result of the service brake being applied, releasing the service brake and applying the parking brake as a function of a release criterion;

initiating without delay application of the parking brake in response to the release criterion; and selecting the release criterion to comprise operation of a control element for application of the parking brake, wherein releasing the service brake is initiated only when the parking brake is applying a selected minimum braking effect ($z_{limit}$);

wherein, when the service brake is used for braking before the vehicle is stationary, a service braking force required to stop the vehicle by braking is calculated and is compared with a maximum parking braking force producible by the parking brake, at least one of an audible and visual warning signal being produced if the service brake force required is greater than the maximum parking braking force.

2. Method according to claim 1, wherein, starting from a state in which the parking brake is applied with a switched-off vehicle drive and a released service brake, the service brake is automatically applied and the parking brake is automatically released when the vehicle drive is started.

3. Method according to claim 2, wherein the releasing of the parking brake is initiated only when the service brake is applying the selected minimum braking effect ($z_{limit}$).

4. Method according to claim 1, wherein opposing release and application of the service brake and of the parking brake are controlled by a characteristic.

5. Method according to claim 1, wherein, when the braking effect of the parking brake is not sufficient to prevent the vehicle from rolling, the service brake is applied again, and at least one of a further audible and visual warning signal is produced.

6. Method according to claim 1, wherein the service brake is applied for braking after the time at which the vehicle becomes stationary, a service braking force being at most as great as the maximum parking braking force producible by the parking brake.

7. Method according to claim 1, wherein, once the service brake has been released and the parking brake has been applied, at least a portion of a braking control is switched off.

8. Method according to claim 1, wherein operation of the control element for the parking brake results in the service brake being applied to maintain the vehicle stationary by the applied service brake, and wherein the service brake is released and the parking brake is applied once a vehicle drive has been switched off.

* * * * *